(12) United States Patent
Koyama et al.

(10) Patent No.: US 7,705,899 B2
(45) Date of Patent: Apr. 27, 2010

(54) AMPLIFICATION TYPE SOLID-STATE IMAGE PICKUP DEVICE DRIVING METHOD

(75) Inventors: Eiji Koyama, Souraku-gun (JP); Takashi Watanabe, Souraku-gun (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 39 days.

(21) Appl. No.: 11/983,013

(22) Filed: Nov. 6, 2007

(65) Prior Publication Data

US 2008/0073679 A1 Mar. 27, 2008

Related U.S. Application Data

(62) Division of application No. 11/039,479, filed on Jan. 19, 2005, now abandoned.

(30) Foreign Application Priority Data

Jan. 28, 2004 (JP) .............................. 2004-019782

(51) Int. Cl.
*H04N 3/14* (2006.01)
*H04N 5/33511* (2006.01)
(52) U.S. Cl. ................. 348/301; 250/208.1; 250/214 A; 257/292; 330/308
(58) Field of Classification Search ......... 257/291–293; 348/302–308, 301; 250/208.1, 214 A; 330/308
See application file for complete search history.

(56) References Cited

U.S. PATENT DOCUMENTS

| | | |
|---|---|---|
| 5,043,820 A | 8/1991 | Wyles et al. |
| 5,322,994 A | 6/1994 | Uno |
| 5,619,262 A | 4/1997 | Uno |
| 6,104,072 A | 8/2000 | Hirota |
| 6,188,092 B1 | 2/2001 | Hatano |
| 6,252,462 B1 | 6/2001 | Hoffman |
| 6,445,022 B1 | 9/2002 | Barna et al. |
| 6,784,934 B1 | 8/2004 | Watanabe |
| 6,850,278 B1 | 2/2005 | Sakurai et al. |
| 6,884,651 B2 | 4/2005 | Toyoda et al. |
| 6,900,839 B1 | 5/2005 | Kozlowski et al. |

(Continued)

FOREIGN PATENT DOCUMENTS

EP 0 757 476 A2 2/1997

(Continued)

*Primary Examiner*—Anh D Mai
(74) *Attorney, Agent, or Firm*—Edwards Angell Palmer & Dodge LLP; David G. Conlin; David A. Tucker (57) ABSTRACT

A plurality of pixel groups X(n) each comprising a plurality of pixels are set, and switched capacitor amplification parts are provided in correspondence to the pixel groups, respectively. Each of the switched capacitor amplification parts has a charge detection node to which output terminals of the transfer transistors of a corresponding pixel group X(n) are connected in common, an amplification part, a reset transistor, a first capacitance element, and a select transistor. A load part common to the switched capacitor amplification parts is provided. The load part is combined with the amplification parts of the switched capacitor amplification parts to constitute inverting amplifiers, respectively. By means of the above constitution, it is capable of obtaining a noise-reduced, high-quality image and which allows transistor count per pixel to be cut, thus allowing the pixel size to be reduced.

1 Claim, 11 Drawing Sheets

U.S. PATENT DOCUMENTS 6,947,088 B2 9/2005 Kochi
6,992,341 B2 1/2006 Watanabe

FOREIGN PATENT DOCUMENTS

| | | |
|---|---|---|
| EP | 1 538 828 A2 | 6/2005 |
| JP | 05-207375 | 8/1993 |
| JP | 08-32065 | 2/1996 |
| JP | 09-46596 | 2/1997 |
| JP | 2000-152086 | 5/2000 |
| JP | 2000-200899 | 7/2000 |
| KR | 2000-057865 | 9/2000 |
| WO | WO-03/021939 A1 | 3/2003 |

AMPLIFICATION TYPE SOLID-STATE IMAGE PICKUP DEVICE DRIVING METHOD

This is a divisional application of co-pending U.S. patent application Ser. No. 11/039,479 filed on 19 Jan. 2005, entitled AMPLIFICATION TYPE SOLID-STATE IMAGE PICKUP DEVICE AND DRIVING METHOD THEREFOR by Koyama Eiji and Takashi Watanabe, the same inventors as the inventors of this divisional application.

This nonprovisional application claims priority under 35 U.S.C. §119(a) on patent application Ser. No. 2004-019782 filed in Japan on Jan. 28, 2004, the entire contents of which are hereby incorporated by reference.

BACKGROUND OF THE INVENTION

The present invention relates to an amplification type solid-state image pickup device and a driving method therefor. More specifically, the invention relates to an amplification type solid-state image pickup device, as well as a driving method therefor, which includes a plurality of pixels each having a photoelectric conversion element and a transfer transistor for transferring signal charge of the photoelectric conversion element, where signals derived from the individual pixels are amplified and outputted to a signal line in common to the pixels.

Generally, there has been wide-spreading an amplification type solid-state image pickup device which has a pixel part provided with an amplification function and a scanning circuit disposed around the pixel section, where pixel data is read from the pixel section by the scanning circuit. In particular, there has been known an APS (Active Pixel Sensor) type image sensor formed of CMOS (Complementary Metal Oxide Semiconductor) which is advantageous for integration of the pixel part with peripheral drive circuit and signal processing circuit.

The APS type image sensor normally includes, in one pixel, a photoelectric conversion part, an amplification part, and a pixel selection part and a reset part. Therefore, for makeup of the APS type image sensor, normally, three to four MOS transistors (Tr) are used in addition to the photoelectric conversion part formed of photodiodes (PD).

Providing three to four MOS transistors per pixel as shown above would become a constraint on reduction of the pixel size. Therefore, lately, there has been proposed a technique for reducing the number of transistors per pixel as shown in FIG. 12 (see, e.g., JP H09-46596A).

Figure 12:
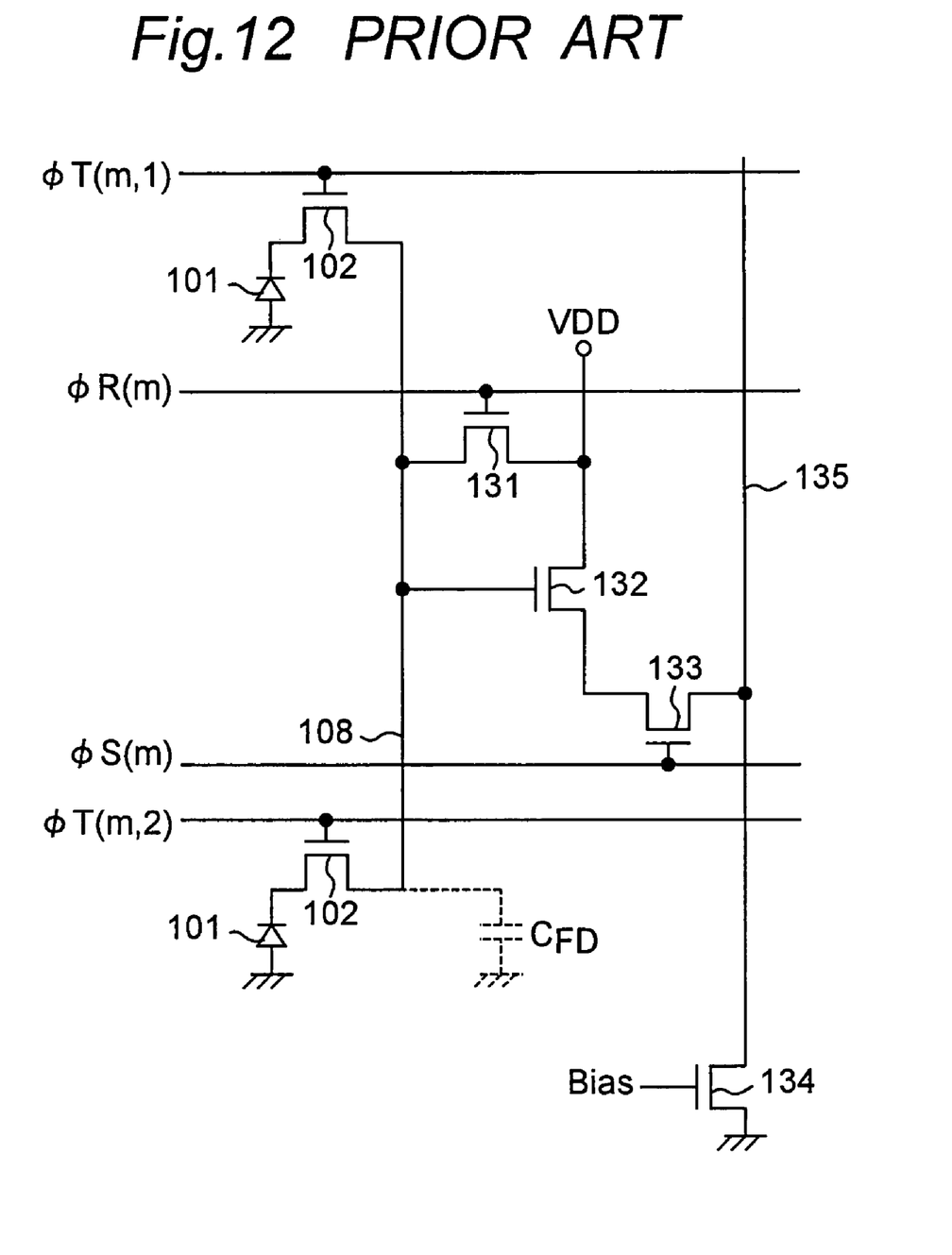
FIG. 12 is a view showing the structure of a two-dimensional amplification type solid-state image pickup device according to the prior art.

The amplification type solid-state image pickup device shown in FIG. 12 includes a plurality of pixels each made up of a photodiode 101 and a transfer transistor 102, and further includes a charge detection node 108 common to a plurality of pixels arrayed in a column direction, a reset transistor 131, an amplification transistor 132 and a select transistor 133. Between a vertical signal line 135 and the ground is interposed a constant-current load transistor 134. All the transfer transistors 102, 131, 132 and 133 are n-channel transistors, and turned ON and OFF depending on High or Low of gate driving signals, respectively.

Figure 13:
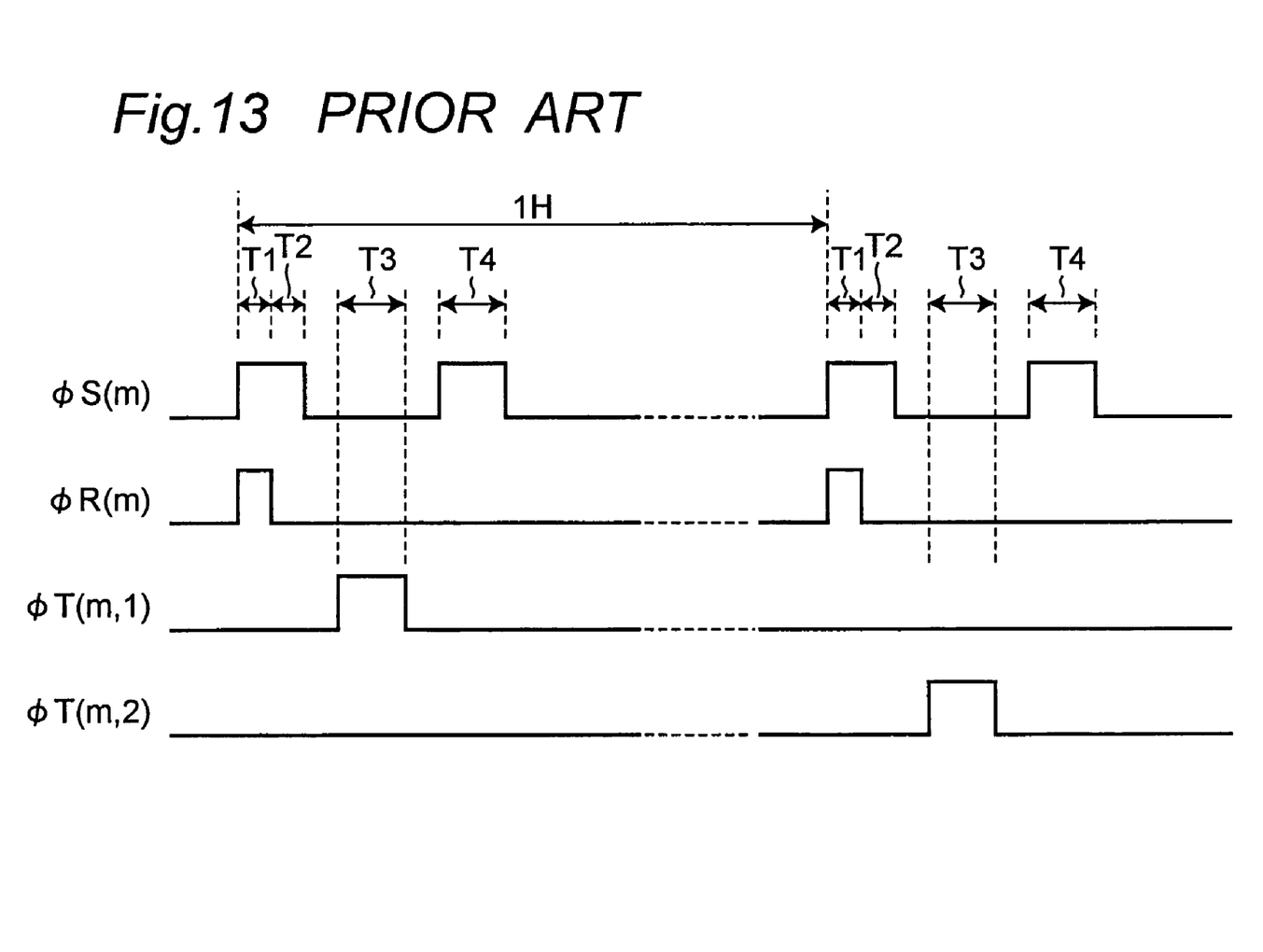
FIG. 13 is a timing chart showing operation timing of the two-dimensional amplification type solid-state image pickup device of FIG. 12.

As shown in FIG. 13, in a period T1, a gate driving signal φR(m) to be applied to the reset transistor 131 goes High level, causing the potential under the gate to become deeper, where there occurs a charge move from the charge detection node 108 to the drain side of the reset transistor 131, causing the voltage of the charge detection node 108 to be reset to the power supply voltage $V_{DD}$ (reset level).

In the next period T2, the gate driving signal φR(m) goes Low level, causing the reset transistor 131 to turn OFF. Meanwhile, since the gate driving signal φS(m) applied to the select transistor 133 goes High level, the reset level is read to the vertical signal line 135 via the amplification transistor 132 and the ON-state select transistor 133. In this case, the amplification transistor 132 and the constant-current load transistor 134 constitute a source follower circuit.

In the next period T3, the gate driving signal φS(m) goes Low level, causing the select transistor 133 to turn OFF. Meanwhile, since a gate driving signal φT(m, 1) applied to the transfer transistor 102 of the 1st line of the m-th row goes High level, the potential under the gate becomes deeper, so that the signal charge (electrons) stored in the photodiode 101 the 1st line of the m-th row is transferred to the charge detection node 108.

In the next period T4, the gate driving signal φT(m, 1) goes Low level, causing the transfer transistor 102 of the 1st line of the m-th row to turn OFF, while the charge detection node 108 is held at the voltage of the signal charge transfer. Meanwhile, because the gate driving signal φS(m) goes High level, a signal level of the m-th row is read to the vertical signal line 135 via the amplification transistor 132 and the ON-state select transistor 133.

After one horizontal scan period (1H period), for the pixel of the 2nd line of the m-th row, signal charge derived from the photodiode 101 of the 2nd line of the m-th row is led to the reset transistor 131, the amplification transistor 132 and the select transistor 133 via the transfer transistor 102 of the 2nd line of the m-th row. Then, operations similar to those of the foregoing T1 to T4 are performed.

In this proposed amplification type solid-state image pickup device, for example, an assumption that one common part (i.e., charge detection node 108, reset transistor 131, amplification transistor 132 and select transistor 133) is given for each two pixels is equivalent to 2.5 transistors per pixel. Also, one common part provided for each four pixels is equivalent to 1.75 transistors per pixel. Therefore, the number of transistors per pixel is reduced, as compared with a general APS image sensor comprising three to four MOS transistors per pixel.

However, with the technique of JP H09-46596A, there would arise problems as shown below. That is, given that the capacitance of the common charge detection node 108 is $C_{FD}$, a charge-voltage conversion efficiency η at which signal charge Qsig derived from the photodiode 101 is converted to a voltage signal Vsig is $$\eta = G \cdot V\text{sig}/Q\text{sig} = G/C_{FD}$$

where G is the gain of the source follower circuit made up of the amplification transistor 132 and the constant-current load transistor 134, being generally smaller than 1.

As apparent from this equation, the capacitance $C_{FD}$ needs to be reduced in order to increase the charge-voltage conversion efficiency η. The capacitance $C_{FD}$ of the common charge detection node 108 is a total sum of drain-side junction capacitances of a plurality of transfer transistors 102 connected to the charge detection node 108, a gate capacitance of the amplification transistor 132, and a node-side junction capacitance of the reset transistor 131. Therefore, the capacitance $C_{FD}$ increases with increasing number of pixels (photodiodes 101 and transfer transistors 102) connected to a common charge detection node 108, which leads to a problem that the charge-voltage conversion efficiency η decreases.

SUMMARY OF THE INVENTION

Accordingly, an object of the present invention is to provide an amplification type solid-state image pickup device, as well as a driving method therefor, which is capable of obtaining noise-reduced high-quality images and reducing the transistor count per pixel to miniaturize the pixel size.

In order to achieve the above object, according to the present invention, there is provided an amplification type solid-state image pickup device which comprises a plurality of pixels each having a photoelectric conversion element and a transfer transistor for transferring signal charge of the photoelectric conversion element, wherein signals derived from the respective pixels are amplified and outputted to a signal line common to the pixels, and wherein:

a plurality of pixel groups each comprising a plurality of pixels are set;

switched capacitor amplification parts are provided in correspondence to the pixel groups, respectively;

each of the switched capacitor amplification parts has a charge detection node to which output terminals of the transfer transistors of a corresponding one of the pixel groups are connected in common, an amplification part to which a signal on the charge detection node is to be inputted, a reset transistor connected between the charge detection node and an output terminal of the amplification part, a first capacitance element connected between the charge detection node and the output terminal of the amplification part, and a select transistor connected between the output terminal of the amplification part and the signal line; and a load part common to the switched capacitor amplification parts is connected between the signal line and power supply of a specified voltage so as to be combined with the amplification parts of the switched capacitor amplification parts to make up inverting amplifiers, respectively.

Herein, the term "connected" refers to being electrically connected.

In the amplification type solid-state image pickup device of this invention, the transistor and the switched capacitor amplification part are controlled properly so that the operation of reading a signal from the photoelectric conversion element via the transfer transistor for each pixel in each pixel group is iterated, by which signals derived from the respective pixels can be amplified and outputted to the signal line (which will be detailed later). According to the amplification type solid-state image pickup device of the invention, since the switched capacitor amplification part (including the amplification part) is common to a plurality of pixels included in each pixel group, the number of transistors per pixel can be reduced. Moreover, since the load part is provided in common to the switched capacitor amplification parts, the structure of the switched capacitor amplification part is simplified, as compared with the case where the load part is provided for each switched capacitor amplification part. Accordingly, the number of transistors per pixel can be further reduced. Further, since the amplification part is of the switched capacitor type, it becomes possible to effectively reduce the capacitance of the charge detection node, so that the charge-voltage conversion efficiency can be enhanced. Thus, even less-noise, higher-quality images can be obtained.

In one embodiment of the amplification type solid-state image pickup device, the photoelectric conversion element is a buried photodiode.

It is noted here that the terms "buried photodiode" refer to a photodiode in which a pn junction is formed in a semiconductor separate from the surface of the semiconductor substrate so that dark currents generated at the surface of photodetection part are not read out.

In this amplification type solid-state image pickup device of one embodiment, since the photoelectric conversion element is a buried photodiode, signal charge stored in the photodiode is transferred without being lost. Therefore, it becomes achievable to reduce noise and obtain higher-quality images.

In one embodiment of the amplification type solid-state image pickup device, the load part comprises a transistor serving as a constant-current load.

In this amplification type solid-state image pickup device of one embodiment, the amplification part and the load part constitute a constant-current load type inverting amplifier, so that the amplification type solid-state image pickup device operates stably.

In one embodiment of the amplification type solid-state image pickup device, the load part comprises a diffusion layer in which impurities are diffused in a semiconductor.

In this amplification type solid-state image pickup device of one embodiment, since the load part comprises a diffusion layer in which impurities are diffused in a semiconductor, the load part formed with relatively high resistance. In this case also, the amplification part and the load part constitute an inverting amplifier, so that the amplification type solid-state image pickup device operates stably.

Preferably, a grounding terminal of each switched capacitor amplification part consists of a light-shielding interconnect pattern common to all the pixels.

In one embodiment of the amplification type solid-state image pickup device, the amplification part and the load part constitute a cascode type inverting amplifier.

In this amplification type solid-state image pickup device of one embodiment, since the amplification part and the load part constitute a cascode type inverting amplifier, the gain becomes larger, as compared with the constant-current load source-grounded type. Therefore, the charge-voltage conversion efficiency can be further enhanced, and even less-noise, higher-quality images can be obtained.

In one embodiment, the amplification type solid-state image pickup device further comprises a control part for controlling the transfer transistor and the switched capacitor amplification part so that an operation of reading a signal from the photoelectric conversion element via the transfer transistor is iterated for each of the pixels in each of the pixel groups.

In this amplification type solid-state image pickup device of one embodiment, the control part controls the transfer transistor and the switched capacitor amplification part so that an operation of reading a signal from the photoelectric conversion element via the transfer transistor is iterated for each of the pixels in each of the pixel groups. Thus, signals derived from the respective pixels can be amplified and outputted to the signal line.

In another aspect of the present invention, there is provided an amplification type solid-state image pickup device driving method for driving the amplification type solid-state image pickup device, which comprises:

a first step of turning on the reset transistor of the switched capacitor amplification part to perform a reset operation;

a second step of, after the first step, turning on the select transistor and turning off the reset transistor to perform a read operation of only a reset level;

a third step of, after the second step, turning on the transfer transistor of the pixel to perform charge transfer from the pixel to the switched capacitor amplification part; and a fourth step of, after the third step, turning off the transfer transistor and turning on the select transistor to perform a read operation of a signal level, wherein operations of the first step to the fourth step are iterated for each of the pixels in each of the pixel groups.

In one embodiment, the amplification type solid-state image pickup device further comprises:

a second capacitance element whose one terminal is connected to the charge detection node; and first boosting means connected to the other terminal of the second capacitance element and serving for deepening potential of the charge detection node by capacitive coupling via the second capacitance element.

In this amplification type solid-state image pickup device of one embodiment, by the first boosting means, potential of the charge detection node is deepened by capacitive coupling via the second capacitance element, by which charge transfer from the photoelectric conversion element to the charge detection node is accelerated. Accordingly, noise can be further reduced, and higher-quality images can be obtained.

In another aspect of the invention, there is provided an amplification type solid-state image pickup device driving method for driving the amplification type solid-state image pickup device, which comprises:

a first step of turning on the reset transistor of the switched capacitor amplification part to perform a reset operation;

a second step of, after the first step, turning on the select transistor and turning off the reset transistor to perform a read operation of only a reset level;

a third step of, after the second step, turning on the transfer transistor of the pixel, in a state that potential of the charge detection node has been deepened by the capacitive coupling via the second capacitance element by the first boosting means, to perform charge transfer from the pixel to the switched capacitor amplification part; and a fourth step of, after the third step, turning off the transfer transistor and turning on the select transistor to perform a read operation of a signal level, wherein operations of the first step to the fourth step are iterated for each of the pixels in each of the pixel groups, whereby the signal is read out from each of the photoelectric conversion elements of the pixel groups.

In one embodiment of the amplification type solid-state image pickup device, terminals of the reset transistor and the first capacitance element included in the switched capacitor amplification part other than and opposite to their terminals connected to the charge detection node are connected to the signal line instead of the output terminal of the amplification part, and wherein the amplification type solid-state image pickup device further comprises a second boosting means connected to the signal line and serving for deepening potential of the charge detection node by capacitive coupling via the first capacitance element.

In this amplification type solid-state image pickup device of one embodiment, by the second boosting means, potential of the charge detection node is deepened by capacitive coupling via the first capacitance element, by which charge transfer from the photoelectric conversion element to the charge detection node is accelerated. Accordingly, noise can be further reduced, and higher-quality images can be obtained.

In another aspect of the invention, there is provided an amplification type solid-state image pickup device driving method for driving the amplification type solid-state image pickup device, which comprises:

a first step of turning on the reset transistor of the switched capacitor amplification part to perform a reset operation;

a second step of, after the first step, turning on the select transistor and turning off the reset transistor to perform a read operation of only a reset level;

a third step of, after the second step, turning on the transfer transistor of the pixel, in a state that potential of the charge detection node has been deepened by the capacitive coupling via the first capacitance element by the second boosting means, to perform charge transfer from the pixel to the switched capacitor amplification part; and a fourth step of, after the third step, turning off the transfer transistor and turning on the select transistor to perform a read operation of a signal level, wherein operations of the first step to the fourth step are iterated for each of the pixels in each of the pixel groups.

As shown above, the present invention is greatly useful for the formation of small-size, high-performance image sensors.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, an amplification type solid-state image pickup device and a driving method therefor of the present invention are described in detail by reference to an embodiment shown in the accompanying drawings.

Figure 1:
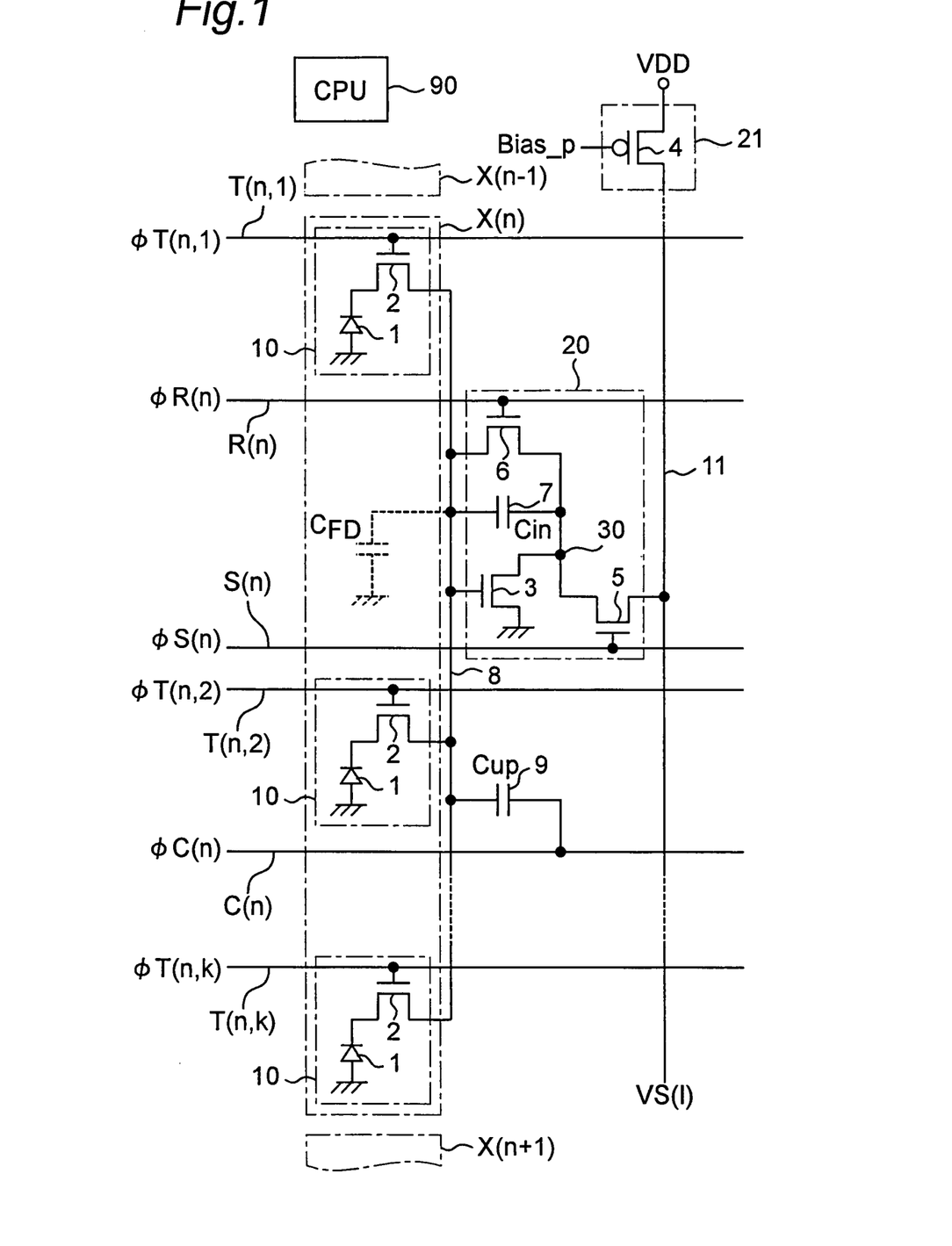
FIG. 1 is a view showing the construction of a two-dimensional amplification type solid-state image pickup device according to an embodiment of the present invention.

FIG. 1 is a circuit diagram showing part of a two-dimensional amplification type solid-state image pickup device according to an embodiment of the present invention. The two-dimensional amplification type solid-state image pickup device includes a plurality of pixels 10 each having a buried photodiode 1 as a photoelectric conversion element and a transfer transistor 2 for transferring signal charge of the photodiode 1. Those pixels 10 are arrayed two-dimensionally in a matrix, and divided into pixel groups X(n−1), X(n), X(n+1), ... (hereinafter, referred to generically as pixel groups X when appropriate) each of which is composed of k pixels (where k≧2) in each column. It is noted that FIG. 1 shows in detail the n-th pixel group X(n) in one column (the 1st column in this example) alone (where n≧2) for simplicity's sake. Such pixel groups X are set in pluralities in row and column directions, respectively.

Each pixel group X is defined by forming a charge detection node 8 to which output terminals of the transfer transistors 2 belonging to the pixel group are connected in common. The capacitance of the charge detection node 8 is represented by capacitance $C_{FD}$. It is noted that charge detection nodes 8 are isolated from each other between pixel groups X.

Reference characters T(n, 1), T(n, 2), ..., T(n, k) denote gate driving signal lines for the transfer transistors 2 belonging to the pixel group X(n), and gate driving signals φT(n, 1), XT(n, 2), ..., φT(n, k) are to be applied thereto, respectively, by a control section 90.

Also, switched capacitor amplification parts 20 are provided in correspondence to the pixel groups X, respectively. Each switched capacitor amplification part 20 is interposed between a corresponding pixel group X and a vertical signal line 11 common to a column to which the pixel group X belongs.

The switched capacitor amplification part 20 has a charge detection node 8 to which output terminals of the individual transfer transistors 2 of a corresponding pixel group X (hereinafter, focused on X(n) for description) are connected in common, an amplification transistor 3 as an amplification part to which a signal on the charge detection node 8 is to be inputted, a reset transistor 6 connected between the charge detection node 8 and an output terminal 30 of the amplification transistor 3, a capacitor 7 (whose capacitance is represented by Cin) as a first capacitance element connected between the charge detection node 8 and the output terminal 30 of the amplification transistor 3, and a select transistor 5 connected between the output terminal 30 of the amplification transistor 3 and the vertical signal line 11.

Reference character R(n) denotes a gate driving signal line for the reset transistor 6, and a gate driving signal φR(n) is to be applied thereto by the control section 90.

Reference character S(n) denotes a gate driving signal line for the select transistor 5, and a gate driving signal φS(n) is to be applied thereto by the control section 90.

A load part 21 is interposed and connected between the vertical signal line 11 and a power supply of the voltage VDD. In the load part 21, a constant-current load transistor 4 serves as a load common to amplification transistors 3 of the individual switched capacitor amplification parts 20 corresponding to one column (the 1st column in this case). In this case, the load part 21 is implemented by the constant-current load transistor 4.

For operation, a constant bias voltage Bias_p for giving a flow of a constant current through the constant-current load transistor 4 is applied to its gate. Thus, the amplification transistor 3 and the constant-current load transistor 4 constitute a constant-current load type source-grounded inverting amplifier. Then, the amplification transistor 3, the constant-current load transistor 4 and the capacitor 7 constitute a switched capacitance amplifier. In addition, the load part 21 does not have to be a constant-current load transistor 4, and the same objective can be achieved even if the load part 21 is formed of a diffusion layer or the like with high resistance. Also, the grounding terminals of the amplification transistors can be interconnected by means of a light-shielding metal common to the pixels.

Reference character C(n) denotes a boosting signal line, and a boosting signal φC(n) is to be applied thereto by the control section 90. Between this boosting signal line C(n) and the charge detection node 8 is connected a capacitor 9 (whose capacitance is represented by capacitance Cup) as a second capacitance element. In operation, the boosting signal φC(n) is raised to a high voltage at a specified timing by the control section 90. Thus, the boosting signal line C(n) and the control section 90 serve as a first boosting means, so that the potential of the charge detection node 8 can be deepened by capacitive coupling via the capacitor 9.

Figure 2:
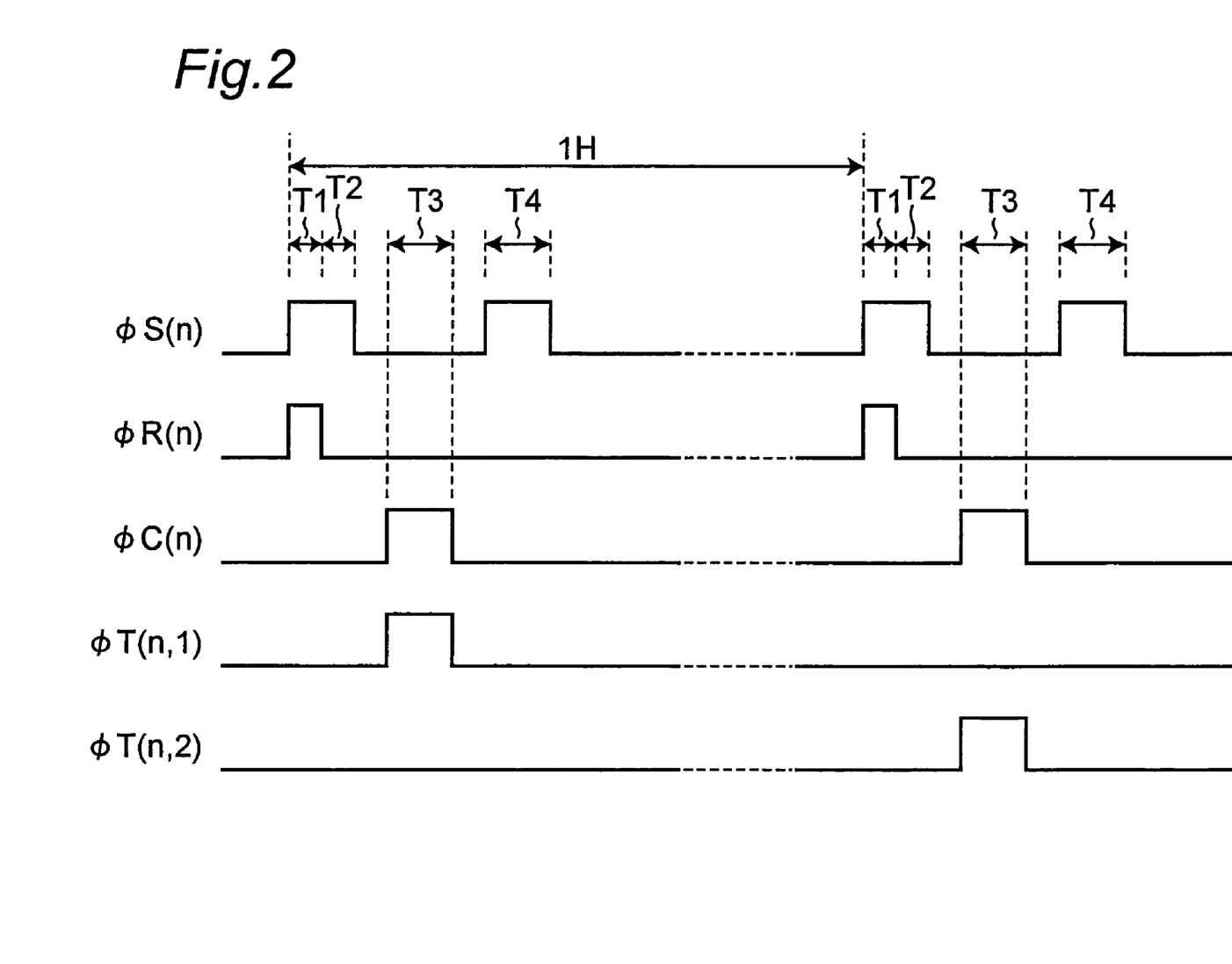
FIG. 2 is a timing chart showing operation timing of the two-dimensional amplification type solid-state image pickup device of FIG. 1.

FIG. 2 shows operation timing of the two-dimensional amplification type solid-state image pickup device under the control by the control section 90 by focusing on the pixel group X(n) and the switched capacitor amplification part 20 corresponding thereto.

In a period T1, a gate driving signal φS(n) applied to the select transistor 5 goes High level and the gate driving signal φR(n) applied to the reset transistor 6 goes High level, where those transistors 5, 6 go ON state. As a result, by the action of the constant-current load type source-grounded inverting amplifier, which is constituted of the amplification transistor 3 and the constant-current load transistor 4, the voltage of the charge detection node 8 is reset to a constant voltage V0 (reset level).

Figure 3:
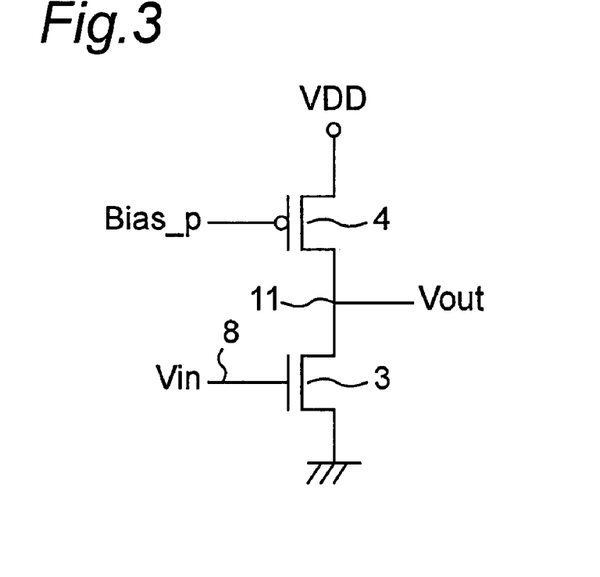
FIG. 3 is a view showing circuit construction of a constant-current load type source-grounded inverting amplifier made up of the elements of FIG. 1.
Figure 4:
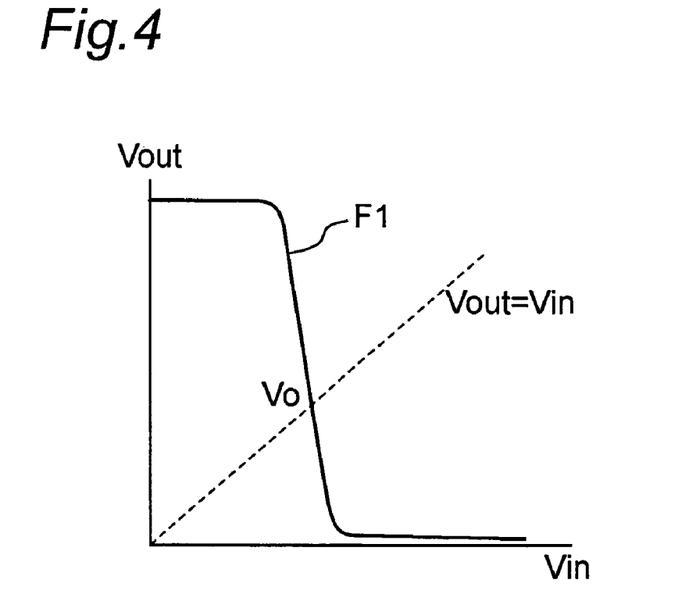
FIG. 4 is a view showing characteristics of the inverting amplifier of FIG. 3.

The reset level Vo is defined as follows. That is, when the transistors 5, 6 are turned ON and short-circuited as described above, the circuit of the constant-current load type source-grounded inverting amplifier, which is constituted of the amplification transistor 3 and the constant-current load transistor 4, is represented as shown in FIG. 3. It is assumed here that an input of the inverting amplifier is Vin and an output thereof is Vout, and further that a characteristic of the inverting amplifier is F1 as shown in FIG. 4. When the transistors 5, 6 are turned ON and short-circuited, it follows that Vout=Vin, so that the reset level Vo is defined as an intersection point between the characteristic F1 and the straight line of Vout=Vin.

In the next period T2, the gate driving signal φR(n) goes Low level, causing the reset transistor 6 to turn OFF. Meanwhile, the gate driving signal φS(n) remains as it is at High level, and the select transistor 5 has been in the ON state. Therefore, an output resulting from inverting and amplifying the voltage of the charge detection node 8, i.e. the reset level Vo, is read to the vertical signal line 11 via the ON-state select transistor 5.

In the next period T3, the gate driving signal 4S(n) goes Low level, causing the select transistor 5 to turn OFF. At this point, the gate driving signal φT(n, 1) goes High level, and the transfer transistor 2 of the 1st pixel 10 in the pixel group X(n) turns ON. Thus, the signal charge stored in the photodiode 1 of the 1st pixel 10 is transferred to the charge detection node 8 through the ON-state transfer transistor 2. Further, in synchronization with the gate driving signal φT(n, 1), the boosting signal φC(n) goes High level. Thus, the potential of the charge detection node 8 is deepened by capacitive coupling via the capacitor 9 (with its capacitance Cup). Accordingly, charge transfer from the photodiode 1 to the charge detection node 8 is accelerated.

It is noted that potential change of the charge detection node 8 is equivalent to the one that results from distributing a voltage increase of the boosting signal line C(n) by the capacitance Cup of the capacitor 9 and the capacitance $C_{FD}$ of the charge detection node 8.

In the next period T4, the gate driving signal φT(n, 1) goes Low level, causing the transfer transistor 2 to turn OFF. Also, since the boosting signal φC(n) goes Low level, the potential change of the charge detection node 8 by the capacitive coupling via the capacitor 9 is canceled. As a result, a voltage (signal level) shifted from the reset level (voltage V0) in the period T2 by an extent due to the signal charge transfer in the period T3 is held at the charge detection node 8. This signal level is amplified by the constant-current load type source-grounded inverting amplifier, which is constituted of the amplification transistor 3 and the constant-current load transistor 4, and read to the vertical signal line 11 through the ON-state select transistor 5 (because the gate driving signal φS(n) has been turned ON).

Then, under the control by the control section 90, extracting a difference signal between the reset level of the period T2 and the signal level of the period T4 read to the vertical signal line 11 makes it possible to obtain an effective signal by the charge generated from the light incident on the 1st pixel 10 in the pixel group X(n).

After one horizontal scan period (1 H period), for the 2nd pixel in the pixel group X(n), operations similar to those of the foregoing periods T1 to T4 are performed.

In this way, by iterating the operations of the periods T1 to T4 for each pixel 10 in each pixel group X, a signal derived from each pixel 10 can be amplified and outputted to the vertical signal line 11 from column to column. The signals read to the vertical signal line 11 are outputted in succession through an unshown horizontal signal line provided in common to the vertical signal line.

Now, given a charge amount Qsig transferred from the photodiode 1 and a gain A of the constant-current load type source-grounded inverting amplifier, an effective signal to be read is $$V\text{sig}=A\cdot Q\text{sig}/[C_{FD}+C\text{up}+(1+A)C\text{in}] \quad (1)$$

where the gain A of the constant-current load type source-grounded inverting amplifier is $$A=gm\cdot(r_{on}//r_{op}) \quad (2)$$

In Equation (2), gm is the transconductance of the amplification transistor 3, $r_{on}$ is the output resistance of the amplification transistor 3, and $r_{op}$ is the output resistance of the constant-current load transistor 4.

In particular, on condition that the amplification gain A is quite large, it follows from Equation (1) that $$V\text{sig}\sim Q\text{sig}/C\text{in} \quad (3)$$

Therefore, the charge-voltage conversion efficiency η is $$\eta=V\text{sig}/Q\text{sig}=1/C\text{in} \quad (4)$$

As can be understood from Equation (4), when the amplification gain A is quite large, there are substantially almost no effects of the capacitance $C_{FD}$ of the charge detection node 8 on outputted signals. Therefore, even if the number of pixels connected in the column direction is increased with $C_{FD}$ increased, no decreases in the charge-voltage conversion efficiency η occur.

Still, according to this two-dimensional amplification type solid-state image pickup device, since the switched capacitor amplification part 20 (including the amplification part) is common to a plurality (k in this case) of pixels 10 included in each pixel group X, the number of transistors per pixel can be reduced. Moreover, since the load part 21 is provided in common to the switched capacitor amplification parts 20 of one column, the structure of the switched capacitor amplification part 20 is simplified, as compared with the case where the load part 21 is provided for each switched capacitor amplification part. Accordingly, the number of transistors per pixel can be further reduced.

Further, since the photodiode 1 is a buried type photodiode, signal charge stored in the photodiode 1 is transferred without being lost. Therefore, noise reduction can be achieved so that a high-quality image becomes obtainable. Still, since the amplification part 20 is of the switched capacitor type, it becomes possible to effectively reduce the capacitance $C_{FD}$ of the charge detection node 8, so that the charge-voltage conversion efficiency η can be enhanced. Thus, even less-noise, higher-quality images can be obtained.

The terms "buried photodiode" refer to a photodiode in which a pn junction is formed in a semiconductor separate from the surface of the semiconductor substrate so that dark currents generated at the surface of photodetection part are not read out. At the surface of the photodetection part of general photodiodes, a Si—$SiO_2$ interface is present and crystal defects tend to occur. Applying a readout voltage to this part causes electric charge to be generated even in a dark state, making a noise source. For suppression of this, for example, an n-type region is diffused and formed on the surface of a p-type semiconductor substrate, and further $p^+$-type region is formed so as to cover the n-type region, by which the n-type region is formed as the "buried type." Then, even with the readout voltage applied, since the dark current generated at the surface is not read out, noise due to the dark current can be reduced.

Figure 5:
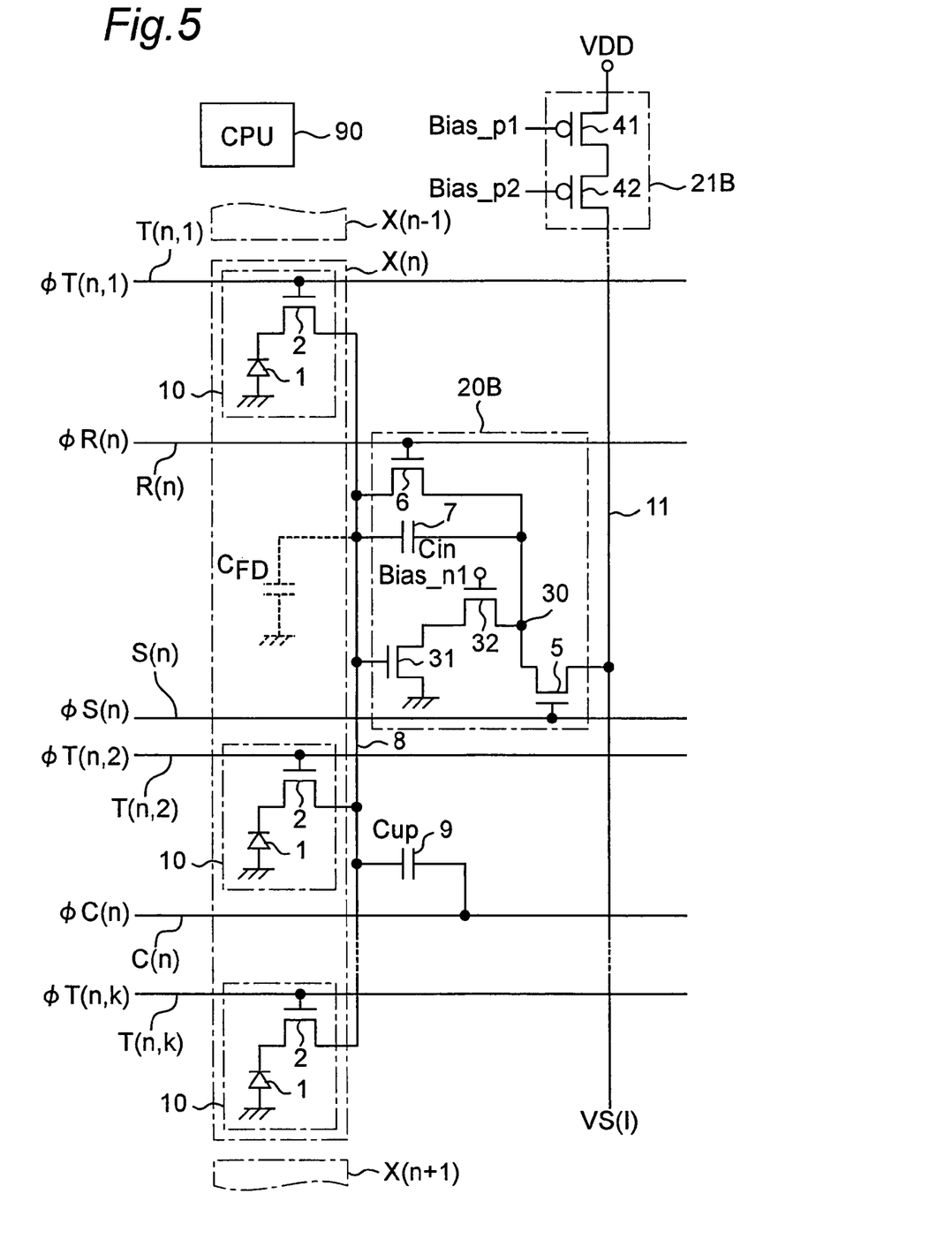
FIG. 5 is a view showing a modification of the two-dimensional amplification type solid-state image pickup device of FIG. 1.

FIG. 5 shows a modification of the two-dimensional amplification type solid-state image pickup device. This two-dimensional amplification type solid-state image pickup device is equivalent to that of FIG. 1 in which the amplification part within each switched capacitor amplification part 20B as well as a load part 21B combined therewith are structurally modified. The rest of the constituent members and operation timing are the same as those of FIG. 1. It is noted that, in FIG. 5, the same constituent members as those of FIG. 1 are designated by like reference numerals and their description is omitted.

The two-dimensional amplification type solid-state image pickup device of FIG. 5 includes, as the amplification part, an amplification transistor 31 and an n-channel cascode transistor 32 connected in series. A signal on the charge detection node 8 is inputted to the gate of the amplification transistor 31. A constant bias voltage Bias_n1 for turning ON the transistor upon operation is inputted to the gate of the n-channel cascode transistor 32.

The load part 21B is comprised of a constant-current load transistor 41 and a p-channel cascode transistor 42 connected in series. To gates of the constant-current load transistor 41 and the p-channel cascode transistor 42, upon operation, are applied constant bias voltages Bias_p1, Bias_p2 for making those transistors serve as constant-current loads, respectively.

Figure 6:
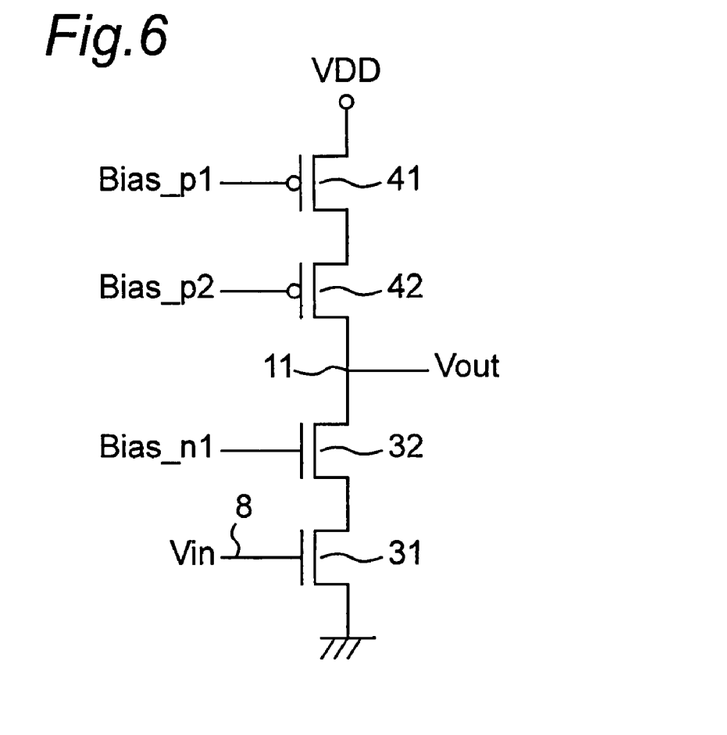
FIG. 6 is a view showing circuit construction of a cascode type inverting amplifier made up of elements in FIG. 5.
Figure 7:
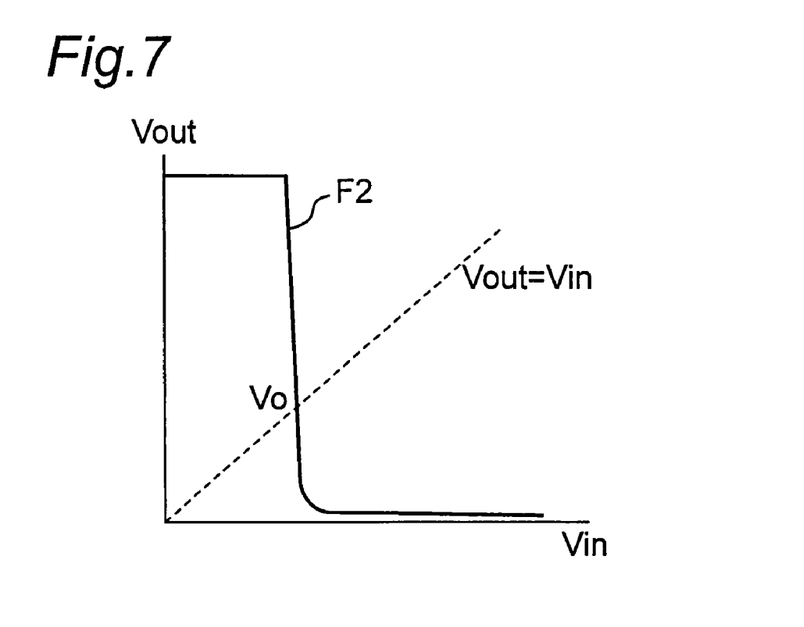
FIG. 7 is a view showing characteristics of the inverting amplifier of FIG. 6.

The circuit of the cascode type inverting amplifier, which is formed from a combination of the amplification part within the switched capacitor amplification part 20B and the load part 21B, is represented as shown in FIG. 6. It is assumed here that an input of the inverting amplifier is Vin and an output thereof is Vout, and further that a characteristic of the inverting amplifier is F1 as shown in FIG. 7. When the select transistor 5 and the reset transistor 6 within the switched capacitor amplification part 20B are turned ON and short-circuited, it follows that Vout=Vin, so that the reset level Vo is defined as an intersection point between the characteristic F2 and the straight line of Vout=Vin.

The gain A of the cascode type inverting amplifier is $$A = gm_1[(gm_2 \cdot r_{on1} \cdot r_{on2})//(gm_3 \cdot r_{op3} r_{op4})] \quad (5)$$

In Equation (5), $gm_1$, $gm_2$ and $gm_3$ are transconductances of the amplification transistor 31, the n-channel cascode transistor 32 and the p-channel cascode transistor 42, respectively. In addition, $r_{on1}$, $r_{on2}$, $r_{op3}$ and $r_{op4}$ are output resistances of the amplification transistor 31, the n-channel cascode transistor 32, the p-channel cascode transistor 42 and the constant-current load transistor 41, respectively. Since the gain A of the cascode type inverting amplifier is several tens of times larger than the gain of the constant-current load type source-grounded inverting amplifier shown in FIG. 3, Cin represented by (3) and (4) can be set smaller. Accordingly, in the two-dimensional amplification type solid-state image pickup device of FIG. 5, the charge-voltage conversion efficiency q can be made even larger, so that higher sensitivity can be achieved.

Figure 8:
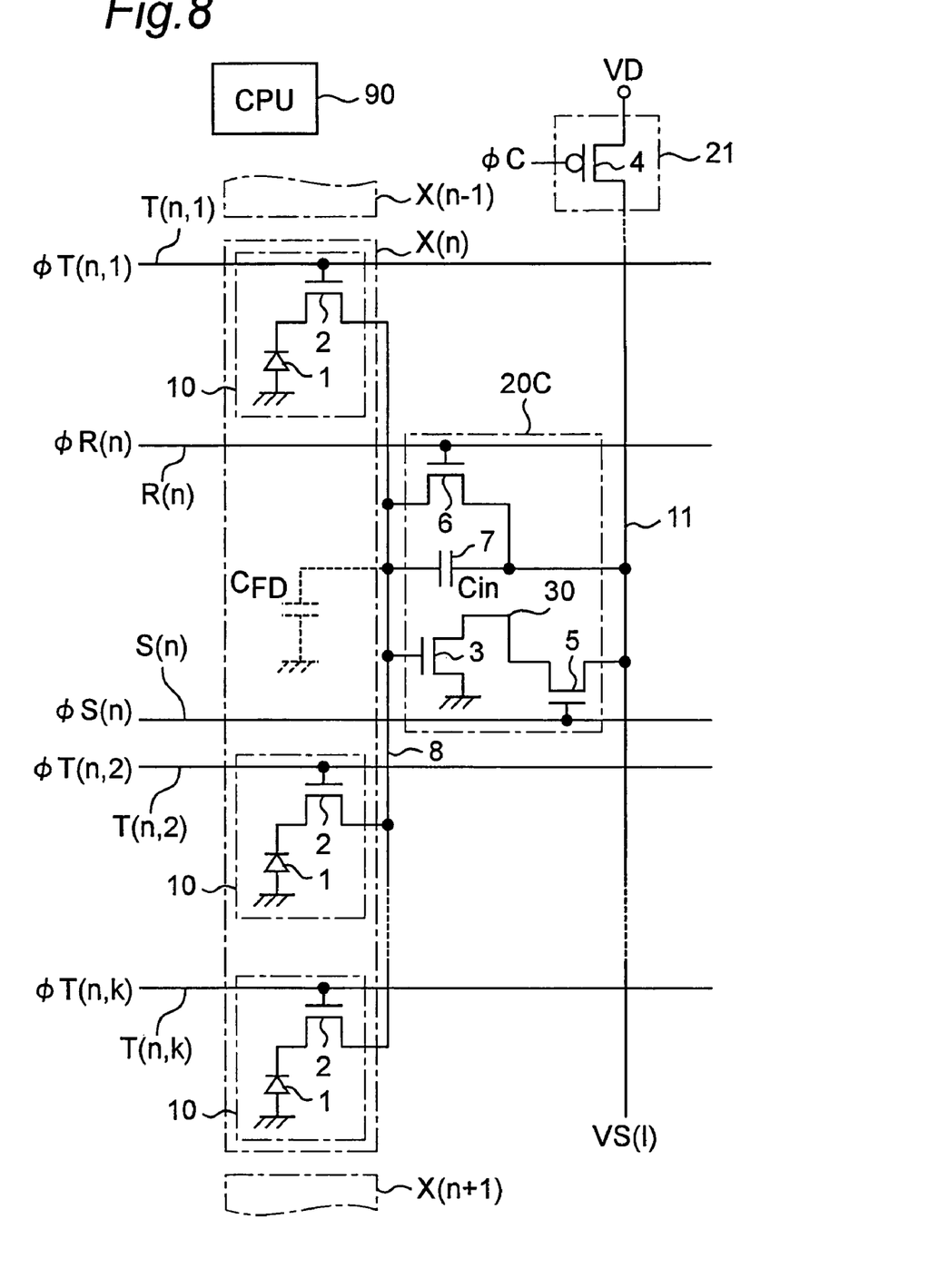
FIG. 8 is a view showing another modification of the two-dimensional amplification type solid-state image pickup device of FIG. 1.

FIG. 8 shows another modification of the two-dimensional amplification type solid-state image pickup device of FIG. 1. It is noted that, also in FIG. 8, the same constituent members as those of FIG. 1 are designated by the same reference numerals, and their description is omitted.

In this two-dimensional amplification type solid-state image pickup device, terminals of the reset transistor 6 and the capacitor 7 other than and opposite to their terminals connected to the charge detection node 8 are connected to the vertical signal line 11 instead of the output terminal 30 of the amplification transistor 3. The capacitor 9 and the boosting signal line C(n) in FIG. 1 are omitted.

Also in this two-dimensional amplification type solid-state image pickup device, not a constant bias but a boosting signal φC is applied to the gate of the p-channel transistor 4 of the load part 21 by the control section 90. Thus, the voltage VD of the vertical signal line 11 is made variable.

Figure 9:
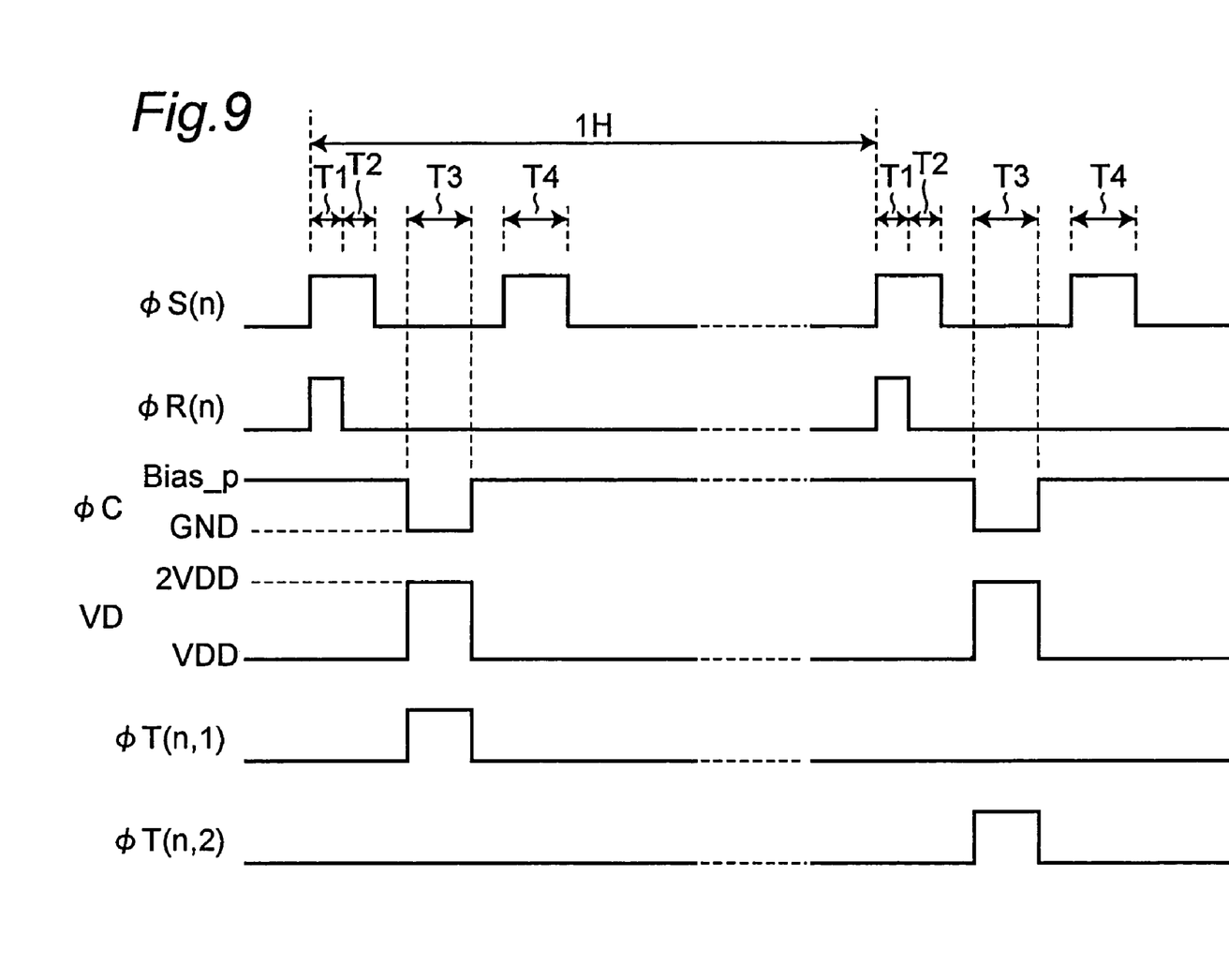
FIG. 9 is a timing chart showing operation timing of the two-dimensional amplification type solid-state image pickup device of FIG. 8.

FIG. 9 shows operation timing of the two-dimensional amplification type solid-state image pickup device under the control by the control section 90 by focusing on the pixel group X(n) and the switched capacitor amplification part 20C corresponding thereto.

Operations of the periods T1, T2 are the same as those described with reference to FIG. 2. In this case, the boosting signal φC applied to the p-channel transistor 4 is set to the bias level Bias_p so that a constant-current load is obtained.

In the next T3, in synchronization with the gate driving signal φT(n, 1), the boosting signal φC goes grounding level GND, making the vertical signal line 11 and the VD terminal short-circuited. Thus, the vertical signal line 11 and the control section 90 serve as the second boosting means so that the voltage VD of the vertical signal line 11 is raised to 2VDD, and the potential of the charge detection node 8 is deepened by capacitive coupling via the capacitor 9 (with its capacitance Cin).

Accordingly, charge transfer from the photodiode 1 to the charge detection node 8 is accelerated.

It is noted that potential change of the charge detection node 8 is equivalent to the one that results from distributing a voltage increase of the vertical signal line 11 by the capacitance Cin of the capacitor 7 and the capacitance $C_{FD}$ of the charge detection node 8. It is also permissible that the voltage increase of the vertical signal line 11 is increased depending on the amount of potential change necessary for the charge detection node 8.

The operation of the next period T4 is the same as that described with reference to FIG. 2.

In this two-dimensional amplification type solid-state image pickup device, the capacitor 9 and the boosting signal line C(n) may be omitted, in comparison with that of FIG. 1. Accordingly, the area of the photodiode 1 can be set larger proportionally, so that higher sensitivity can be achieved.

Figure 10:
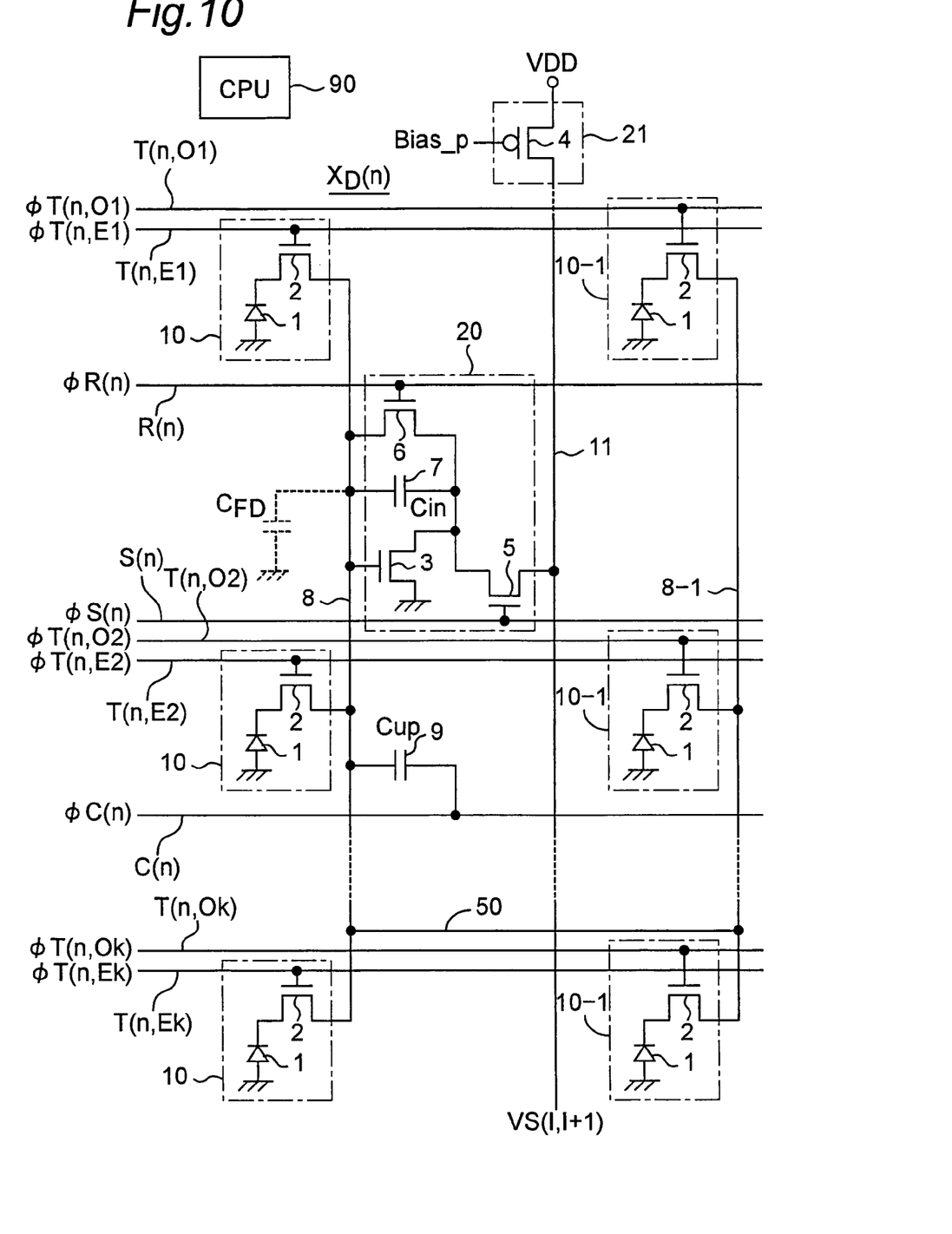
FIG. 10 is a view showing another modification of the two-dimensional amplification type solid-state image pickup device of FIG. 1.

FIG. 10 shows still another embodiment modification of the two-dimensional amplification type solid-state image pickup device of FIG. 1. It is noted that, also in FIG. 10, the same constituent members as those of FIG. 1 are designated by the same reference numerals and their description is omitted.

In the example of FIG. 1, the pixel group X is composed of k (k≧2) pixels within each column. However, in the example of FIG. 10, a pixel group $X_D$ is set so as to stretch over adjoining two columns (in this case, 1st column and (I+1)th column). For instance, the n-th (where n≧2) pixel group $X_D$(n) with respect to the column direction in the figure contains k pixels 10 in the 1st column and k pixels 10-1 in the adjoining (I+1)th column.

Output terminals of the individual transfer transistors 2 of the k pixels 10 in the 1st column are connected in common to form a charge detection node 8. Similarly, output terminals of the individual transfer transistors 2 of the k pixels 10-1 in the (I+1)th column are connected in common to form a charge detection node 8-1. Those charge detection nodes 8, 8-1 are connected to each other by a connection line 50, forming substantially one charge detection node.

Such a pixel group $X_D$ that stretches over two columns is set in pluralities in the row and column directions, respectively. Then, switched capacitor amplification parts 20 are provided in correspondence to the pixel groups $X_D$, respectively.

Reference characters T(n, O1), T(n, O2), ..., T(n, Ok) denote gate driving signal lines for the transfer transistors 2 of the pixels 10-1 of odd-numbered columns, respectively, and T(n, E1), T(n, E2), ..., T(n, Ek) denote gate driving signal lines for the transfer transistors 2 of the pixels 10 of even-numbered columns. Gate driving signals φT(n, O1), φT(n, O2), ..., φT(n, Ok) and φT(n, E1), φT(n, E2), ..., φT(n, Ek) are to be applied to those gate driving signal lines, respectively, by a control section 90.

Figure 11:
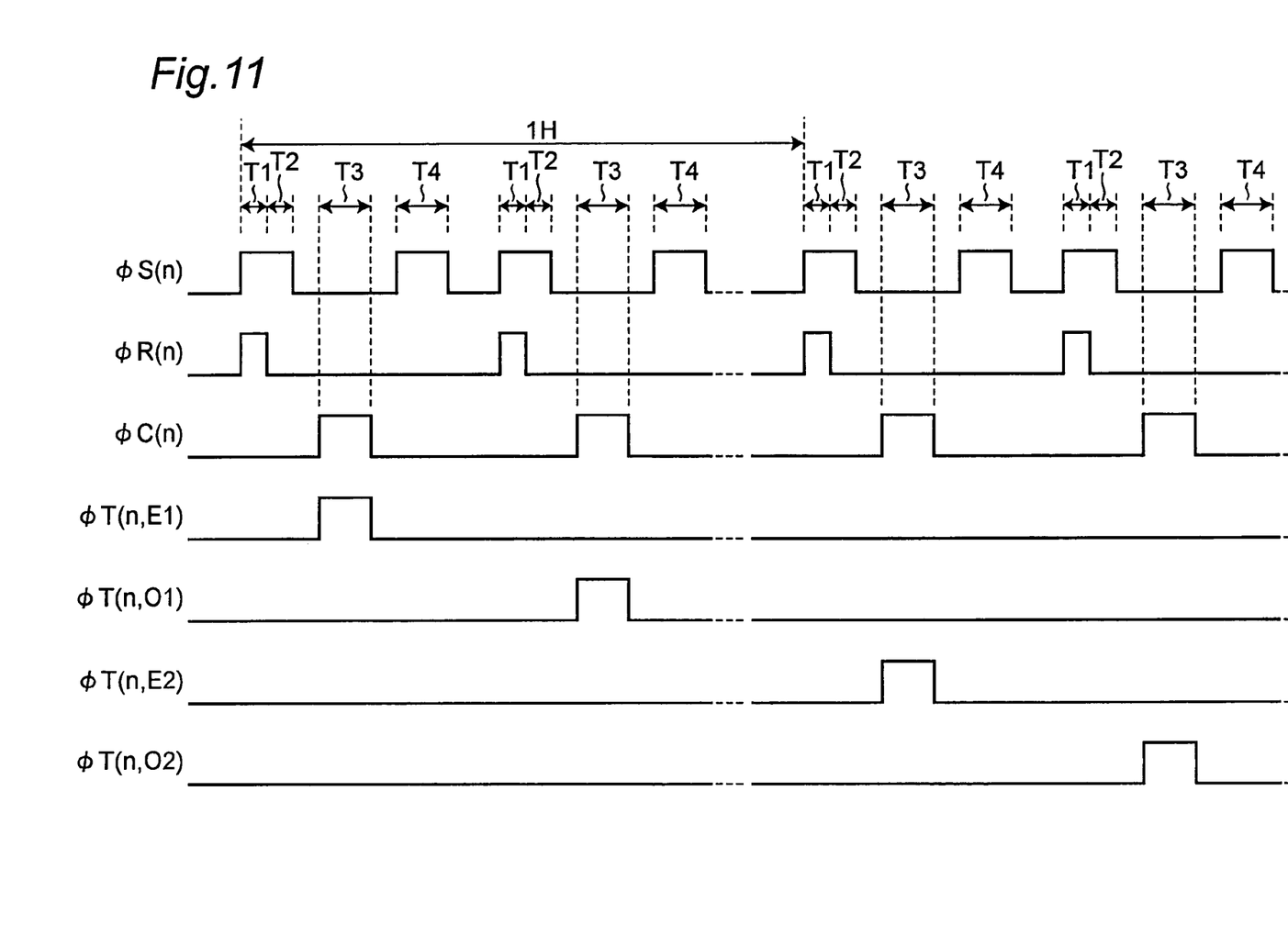
FIG. 11 is a timing chart showing operation timing of the two-dimensional amplification type solid-state image pickup device of FIG. 10.

FIG. 11 shows operation timing of the two-dimensional amplification type solid-state image pickup device under the control by the control section 90 by focusing on the pixel group $X_D$(n) and the switched capacitor amplification part 20 corresponding thereto.

In this example of FIG. 11, in one horizontal period (1 H period), operations of the periods T1 to T4 for the pixels 10 of even-numbered columns as well as operations of the periods T1 to T4 for the pixels 10-1 of odd-numbered columns are performed in iteration of two times. The one-time operations of the periods T1 to T4 are the same as those described with reference to FIG. 2. Thus, signals can be read out for each of the pixels 10, 10-1 in each pixel group $X_D$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for driving an amplification type solid-state image pickup device of the type that includes:
   a plurality of pixels each having a photoelectric conversion element, said plurality of pixels defining a plurality of pixel groups each comprising multiple pixels,
   a transfer transistor, and
   switched capacitor amplification parts respectively corresponding to the pixel groups;
      each of the switched capacitor amplification parts having:
         a charge detection node to which output terminals of the transfer transistors of a corresponding one of the pixel groups are connected in common,
         an amplification part in communication with signals on the charge detection node,
         a reset transistor connected between the charge detection node and an output terminal of the amplification part,
         a first capacitance element connected between the charge detection node and the output terminal of the amplification part,
         a select transistor connected between the output terminal of the amplification part and the signal line, and;
         a load part common to the switched capacitor amplification parts connected between the signal line and power supply of a specified voltage so as to be combined with the amplification parts of the switched capacitor amplification parts to make up inverting amplifiers, respectively;
   said method comprising the steps of:
      turning on the reset transistor of the switched capacitor amplification part to perform a reset operation;
      after turning on the reset transistor of the switched capacitor amplification part, turning on the select transistor and turning off the reset transistor of the switched capacitor amplification part to perform a read operation of only a reset level;
      after turning on the select transistor and turning off the reset transistor of the switched capacitor amplication part, turning on the transfer transistor of the pixel to perform amplified charge signal transfer from the pixel to the charge detection node of the switched capacitor amplification part;
      after performing said amplified charge signal transfer from the pixel to the charge detection node of the switched capacitor amplification part, turning off the transfer transistor and turning on the select transistor to perform a read operation of a signal level with the inverting amplifier by sending a signal from the charge detection node of the switched capacitor amplification part to the load part on the signal line through the amplification part and the select transistor,
   providing said inverting amplifiers with a large gain such that referring to a charge-voltage conversion efficiency between the charge transferred from the pixel and the signal read with the inverting amplifier as $\eta$, and referring to a capacitance of the first capacitance element as Cin, a relation $\eta = 1/C\text{in}$ is substantially satisfied, and
   iterating the operations of the first four steps above for each of the pixels in each of the pixel groups.

* * * * *